J. J. YOUNG.
Steel Tires.

No. 133,739.            Patented Dec. 10, 1872.

WITNESSES:
Jos. S. Johnston
Lewis A. Young

INVENTOR:
John Jay Young

UNITED STATES PATENT OFFICE.

JOHN JAY YOUNG, OF CHICAGO, ILLINOIS.

IMPROVEMENT IN STEEL TIRES.

Specification forming part of Letters Patent No. 133,739, dated December 10, 1872.

*To all whom it may concern:*

Be it known that I, JOHN JAY YOUNG, of Chicago, county of Cook and State of Illinois, have invented certain Improvements in Steel Tires, of which the following is a specification:

My invention relates to the use of a layer of wrought-iron or other soft and tough metal, to which steel can be welded, combined with cast-steel or chrome-steel, in the construction of steel tires for such wheels as are used in locomotion. The combination is made in such a way that the outside or wearing surface of the tire shall be composed of steel, and either its opposite inside face or its central part shall be composed of a layer of wrought-iron or other soft and tough metal welded to the steel.

Figure 3:
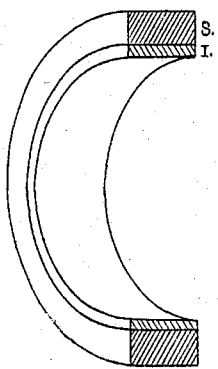
Figure 1:
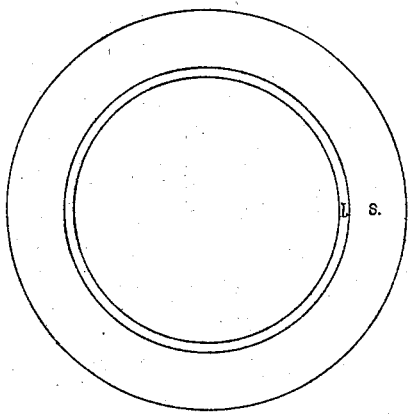
Figure 2:
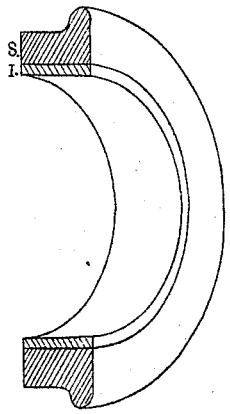
Figure 6:
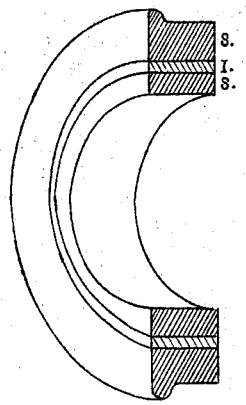
Figure 4:
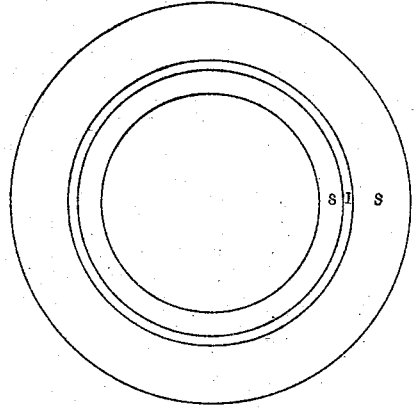
Figure 5:
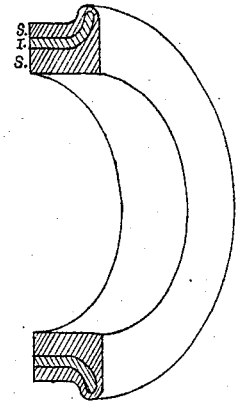
Figure 7:
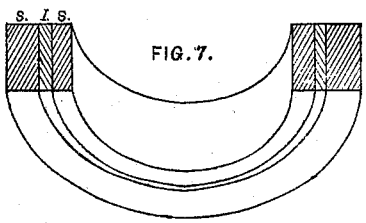

Figure 1 represents a tire with the iron on the inside face. Figs. 2 and 3 are sectional views of such tires. Fig. 4 represents a tire with the iron in the central part. Figs. 5, 6, and 7 are sectional views, showing different positions of iron in the center of the tire.

In each of the figures above enumerated, I represents the layer or ring of wrought-iron or other soft and tough metal, and S the steel.

I do not claim the invention of a combination of steel and iron united by welding so as to make "iron-backed" or "iron-center" steel; but

I claim as my invention—

The use and application of the combinations, as aforesaid, in the construction of steel tires for wheels used in locomotion, the purpose of such use and application being to strengthen the tire and prevent its breaking, chipping, or splitting, especially if it be desired to temper and give a uniform hardness to the tire.

JOHN JAY YOUNG.

Witnesses:
    JOS. S. JOHNSTON,
    LEWIS A. YOUNG.